(12) United States Patent
Toledo et al.

(10) Patent No.: US 9,260,090 B2
(45) Date of Patent: Feb. 16, 2016

(54) VEHICLE PARK ASSIST SYSTEM AND METHOD FOR PARKING A VEHICLE USING SUCH SYSTEM

(75) Inventors: Salvador Toledo, Ypsilanti, MI (US); Janet Meise, Köln (DE); Dirk Gunia, Pulheim (DE); Torsten Wey, Moers (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1930 days.

(21) Appl. No.: 12/554,114

(22) Filed: Sep. 4, 2009

(65) Prior Publication Data

US 2011/0057813 A1 Mar. 10, 2011

(51) Int. Cl.
| | |
|---|---|
| *G08G 1/00* | (2006.01) |
| *B60T 7/22* | (2006.01) |
| *B60W 10/18* | (2012.01) |
| *B60W 10/20* | (2006.01) |
| *B60W 30/06* | (2006.01) |
| *B62D 15/02* | (2006.01) |
| *G08G 1/16* | (2006.01) |
| *G01S 1/00* | (2006.01) |

(52) U.S. Cl.
CPC *B60T 7/22* (2013.01); *B60W 10/18* (2013.01); *B60W 10/20* (2013.01); *B60W 30/06* (2013.01); *B62D 15/0285* (2013.01); *G08G 1/168* (2013.01); *G01S 1/00* (2013.01); *G08G 1/00* (2013.01)

(58) Field of Classification Search
CPC .................................. G08G 1/00; G01S 1/00
USPC ...................... 340/932.2, 435; 701/1, 301, 41
See application file for complete search history.

(56) References Cited

U.S. PATENT DOCUMENTS

| | | | |
|---|---|---|---|
| 6,919,822 B2 | 7/2005 | Tanaka et al. | |
| 6,948,729 B2 | 9/2005 | Zalila et al. | |
| 7,117,073 B2 | 10/2006 | Endo et al. | |
| 7,526,368 B2 | 4/2009 | Endo et al. | |
| 2005/0203686 A1* | 9/2005 | Maier et al. | 701/36 |
| 2006/0235590 A1* | 10/2006 | Bolourchi et al. | 701/41 |
| 2008/0033647 A1 | 2/2008 | Milark et al. | |
| 2009/0043430 A1* | 2/2009 | Boss et al. | 701/1 |
| 2009/0271114 A1* | 10/2009 | Herbert et al. | 701/301 |

* cited by examiner

*Primary Examiner* — Shirley Lu
(74) *Attorney, Agent, or Firm* — Frank A. MacKenzie; MacMillan, Sobanski & Todd, LLC

(57) ABSTRACT

A method for parking a vehicle in a parking spot comprises scanning objects to determine if a feasible parking space is available, the neighboring objects including at least one object either in front of or behind the vehicle and at least one object alongside the vehicle; determine whether there is a sufficient slot length in which to park the vehicle and to determine a height of the object alongside which the vehicle is to be parked in order to park the vehicle at a lateral distance from the object alongside the vehicle dependent upon the particular height of such object relative to a height of a bottom of a door; and parking the vehicle in the space wherein the vehicle is parked at the lateral distance from the object vehicle based upon the detected height of such object relative to the height of the bottom of the door.

20 Claims, 2 Drawing Sheets

VEHICLE PARK ASSIST SYSTEM AND METHOD FOR PARKING A VEHICLE USING SUCH SYSTEM

BACKGROUND OF THE INVENTION

This invention relates in general to vehicle park assist systems and in particular to an improved park assist system and method for parking of such a vehicle.

Vehicle park assist systems are used to identify a feasible parking space, e.g., a parallel parking space or a garage parking space, and then take over the steering of the vehicle to maneuver the vehicle into the identified space hands free. During operation, the driver still shifts the transmission and operates the gas and brake pedals. Thus, while the steering is done automatically, the driver is still responsible for safe parking of the vehicle.

One known vehicle park assist system is disclosed in U.S. Pat. No. 7,526,368 to Endo et al. and includes an electronic control unit (ECU) for parking assistance, a back camera connected to the ECU, a touch display connected to the ECU, and an electric power assisted steering (EPS) apparatus connected to the ECU. In operation, the back camera takes an image of an area extending on a rear side of the vehicle and supplies the image information around the rear of the vehicle to the parking assistance ECU. The parking assistance ECU displays a real picture taken by the back camera to the touch display when a shift position of the vehicle is at a reverse position. The touch display is provided with a touch operation part of a pressure sensitive type or a temperature sensitive type which enables operation by the vehicle driver to set a target parking position on the display by displacing the picture of the vehicle taken by the back camera into a parking space frame on the touch display. In the Endo et al. system, after the target parking position is set by the driver via manual manipulation of the vehicle into a parking space frame on the touch display, the parking assistance ECU performs an automatic steering of the EPS along a calculated path to the target parking position.

Known park assist systems for vehicles are configured to assume that the vehicle is parking against a wall at all times. This is done in order to allow sufficient room for the associated vehicle door to be opened to allow either a passenger(s) from within enough room to open the associated door(s) to exit the vehicle and/or a passenger(s) from outside the vehicle enough room to open the associated door(s) to enter into the vehicle. Thus, it would be desirable to provide a park assist system and method for parking a vehicle which could recognize and distinguish between parking adjacent a wall or other high height object, a curb or other low height object, or any other associated objects in order to optimize the desired end parking position of the vehicle while still allowing sufficient space for the door to be opened for passenger exit and entry.

SUMMARY OF THE INVENTION

This invention relates to a improved park assist system and method for parking of such a vehicle which can recognize and distinguish between parking adjacent a wall or other high height object, a curb or other low height object, or any other associated objects in order to optimize a desired target parking space while still allowing sufficient space for the door to be opened for passenger exit and entry. According to one embodiment, the park assist system for parking a vehicle in a target parking space comprises: a park assist system having a sensing system which determines whether there is a sufficient slot length in which to park the vehicle and determines a height of a object alongside which the vehicle is to be parked in the target parking space in order to park the vehicle at a predetermined lateral distance from the object alongside the vehicle dependent upon the particular detected height of such object relative to a predetermined height of a bottom of an associated door of the vehicle.

According to another embodiment, a method for parking a vehicle in a target parking spot comprises the steps of: (a) providing a vehicle having a sensing system and a park assist system operatively connected thereto, the sensing system including at least one ultrasonic sensor which provides an input signal to the park assist system; (b) scanning neighboring objects using the ultrasonic sensor to determine if a feasible target parking space is available for parking the vehicle, the neighboring objects including at least one object either in front of or behind the vehicle when parked in the target parking space and at least one object alongside the vehicle when parked in the target parking space; (c) using the park assist system to determine whether there is a sufficient slot length in which to park the vehicle and to determine a height of the object alongside which the vehicle is to be parked in the target parking space in order to park the vehicle at a predetermined lateral distance from the object alongside the vehicle dependent upon the particular detected height of such object relative to a predetermined height of a bottom of an associated door of the vehicle; and (d) parking the vehicle in the target parking space using the park assist system wherein the vehicle is parked at the predetermined lateral distance from the object alongside the vehicle based upon the detected height of such object relative to the predetermined height of the bottom of the associated vehicle door.

According to yet another embodiment, the method for parking a vehicle in a target parking spot comprises the steps of: (a) providing a vehicle having a sensing system, a park assist system operatively connected to the sensing system, a steering system including a steering wheel, and a powertrain system; (b) activating the sensing system to determine if there is a feasible target parking space available for parking of the vehicle, the sensing system determining whether there is a sufficient slot length in which to park the vehicle and determining a height of an object alongside which the vehicle is to be parked in order to park the vehicle at a predetermined lateral distance from the object dependent upon the particular detected height of such object relative to a predetermined height of a bottom of an associated door of the vehicle; (c) prompting the driver that a feasible target parking space is available; (d) instructing the driver to stop the vehicle, remove their hands from the steering wheel of the steering system, and engage the powertrain system into reverse; and (e) controlling the steering wheel to execute a calculated steering trajectory provided by the park assist system in order to park the vehicle into the target parking space.

Other advantages of this invention will become apparent to those skilled in the art from the following detailed description of the preferred embodiments, when read in light of the accompanying drawings.

BRIEF DESCRIPTION OF THE DRAWINGS

FIG. 1A is a schematic diagram of a portion of the park assist system illustrated in FIG. 1, showing the associated vehicle used therewith.

FIG. 1B is a partial elevational view of a portion of the park assist system illustrated in FIG. 1.

DETAILED DESCRIPTION OF THE PREFERRED EMBODIMENTS

Figure 1:
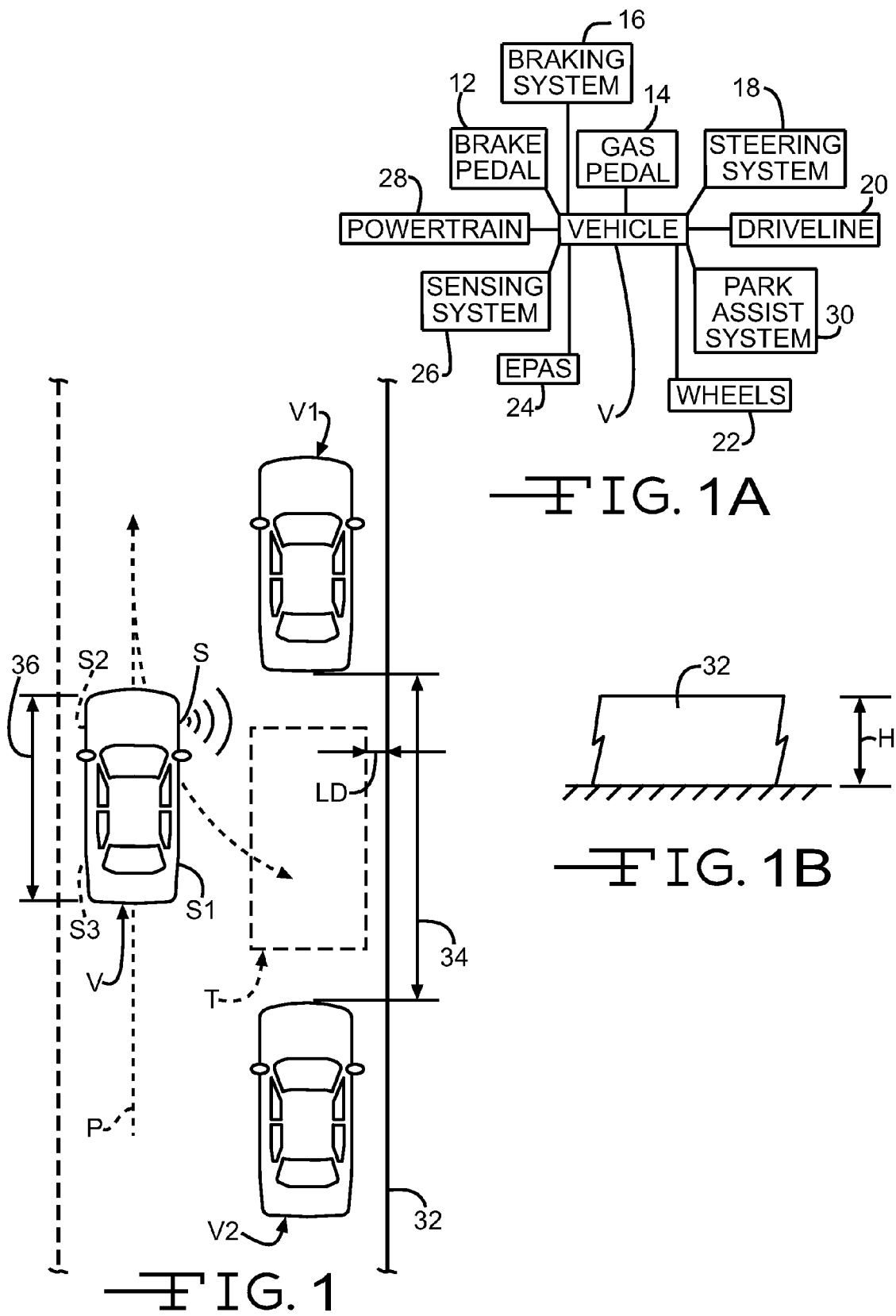
FIG. 1 is a schematic diagram of a first embodiment of a path to a target parking space using a park assist system according to the present invention.

Referring now to FIG. 1, there is illustrated a schematic diagram of a first embodiment of a path P for parking of a vehicle V to a target parking space or spot T between two parked vehicles V1 and V2, using a park assist system, which will be described in detail below, according to the present invention. In the illustrated embodiment, the vehicle V, schematically shown in FIG. 1A, includes at least the following components or systems: a brake pedal 12, a gas pedal 14, a braking system 16, a steering system 18, a driveline system 20, wheels 22, an electric or electro-hydraulic power assisted steering (EPAS) system 24 which is part of the steering system 18, a sensing system 26, a powertrain system 28, and a park assist system 30. However, it must be understood that the vehicle V to be parked may include any other suitable components or systems and that only those components or systems which are necessary for describing and explaining the function and operation of the present invention are illustrated herein.

In the illustrated embodiment, the sensing system 26 is operatively connected to the park assist system 30 to provide input signal(s) thereto and preferably includes ultrasonic sensors, odometric sensors, and an absolute steering wheel angle sensor. The ultrasonic sensors may be located on a side(s) of a front and/or rear bumpers of the vehicle V. In the illustrated embodiment of FIG. 1, an ultrasonic sensor, indicated generally at S is illustrated schematically as being located at least on a front passenger or right side bumper of the vehicle V. Alternatively, the number and or the location of the ultrasonic sensors may be other than illustrated if so desired. For example, one or more ultrasonic sensors may be located on the front driver side bumper of the vehicle V (as shown at S2 in FIG. 1), on one or both of the rear bumpers of the vehicle (as shown as S1 and S3 in FIG. 1), or in any suitable combinations of or desired locations thereof on the vehicle V. Also, the types of sensors may be other than illustrated and described. For example, a relative steering wheel angle sensor may be used instead of the absolute steering wheel angle sensor; others sensors, such as for example, radar, thermal, optical (e.g., Light Detection and Ranging (LIDAR), and laser may be used instead of or in combination with the ultrasonic side sensors; and/or a global positioning system (GPS) may be used instead of the odometric sensors.

In the illustrated embodiment, the odometric sensors may be located on one or more of the wheels 22 of the vehicle V and/or in the driveline system 20 of the vehicle. The absolute steering wheel angle sensor is located on the steering system 18 of the vehicle and preferably is located on a steering wheel of the steering system 18. Alternatively, the construction and/ or the components of the sensing system 26 of the vehicle V may be other than illustrated and described if so desired.

In the illustrated embodiment, the vehicle V is parked into the target parking space T using the park assist system 30 of the present invention. To accomplish this, at least one of the ultrasonic sensors is used in conjunction with the odometric sensors and the absolute steering wheel angle sensor to scan neighboring objects and their location relative to the position of the vehicle V as a driver of the vehicle drives by them. In the illustrated embodiment of FIG. 1, the neighboring objects are illustrated as being the two parked vehicles V1 and V2 and an object 32, such as for example, a curb or a wall. However, one or more of the neighboring objects may be other kinds or types than that which are illustrated and described.

The information from the sensors is processed by a computer of the park assist system 30 to determine if a valid path trajectory can be performed to park the vehicle V into the target parking space T. The calculation by the computer of the park assist system 30 not only includes a determination of a slot length 34 depending upon a length 36 of the vehicle V, but also considers if there is sufficient space to maneuver the vehicle V into the target parking space T.

According to the present invention, the park assist system 30 also determines an associated height of the object 32 alongside which the vehicle V is to be parked. In the illustrated embodiment, the object 32 alongside which the vehicle V is to be parked is shown as being a continuously extending object have a substantially uniform height between the two parked vehicles V1 and V2, such as for example, a wall or a curb. To accomplish this, the park assist system 30 uses information from the at least one ultrasonic sensor S of the sensing system 26 to determine the associated relative height of the wall or curb 32.

As shown in FIG. 1B, the ultrasonic sensor S of the sensing system 26 of the park assist system 30 determines a height H of the object 32 alongside which the vehicle V is to be parked. The height H of the object 32 is used to determine a lateral distance LD, shown in FIG. 1, which the vehicle V is to be parked relative to the object 32 in the target parking spot T. The height H of the object 32 is used in order to ensure that there is sufficient room or space to open the associated door(s) of the vehicle V to allow the passenger(s) to exit and/or enter the vehicle V when the vehicle V is in the target parking space T.

According to the park assist system 30 of the present invention, the height H of the object 32 is preferably compared to a predetermined height of the bottom of the associated vehicle door(s) of the vehicle V in order to determine whether the door can be opened and pass over or above the object 32 or not. In the case in which the height of the object 32 is such that the vehicle door can be opened and pass over the object 32, such as in the case of a low height object, i.e., a curb, the vehicle V can be parked a closer lateral distance LD to the object 32 compared to the case in which the height of the object 32 is such that the vehicle door cannot be opened and pass over the object 32, such as in the case of a wall, garbage can, dumpster, fire hydrant, tree, column, pole, etc. Thus, detecting the height of the object 32 alongside which the vehicle V is to be parked enables the lateral distance LD of the parking of the vehicle V in the target parking spot T to be predetermined and thereby optimized for subsequent parking of the vehicle V in the target parking spot T depending upon the particular detected height of the object 32.

Alternatively, the park assist system 30 may allow the driver the capability or option to override the system. For example, if the park assist system 30 determines that the height H of the object 32 does not allow the door to be opened and pass over the object 32, the park assist system 30 could allow the driver to option or capability to override the system and park the vehicle V adjacent the object a closer lateral distance LD as though the door could pass over the object 32. This could be instances in which the driver was parking the vehicle V in a spot on the passenger side next to a wall but no passenger was in the vehicle so that the driver did not need sufficient space to allow the passenger door to be opened a sufficient amount for the passenger to exit and/or enter the parked vehicle. Alternatively, there could be other instances in which the driver may want to override the system.

Figure 2:
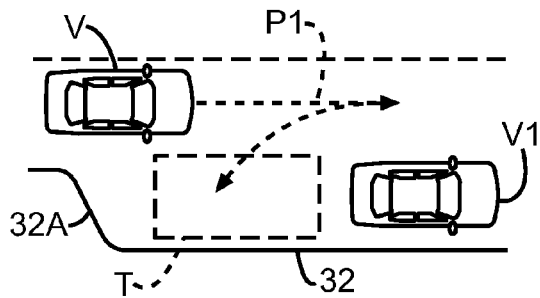
FIG. 2 is a schematic diagram of a second embodiment of a path to a target parking space using the park assist system according to the present invention.

Referring now to FIG. 2 and using like reference numbers to indicated corresponding elements, there is illustrated schematic diagram of a second embodiment of a path P1 to a target parking space T using the park assist system 30 according to the present invention. In this embodiment, the vehicle V is parked between a parked "forward" vehicle V1 and a "rearward" object 32A which, in the illustrated embodiment, is part of the object 32 alongside which the vehicle V is to be parked in the target parking space T.

Figure 3:
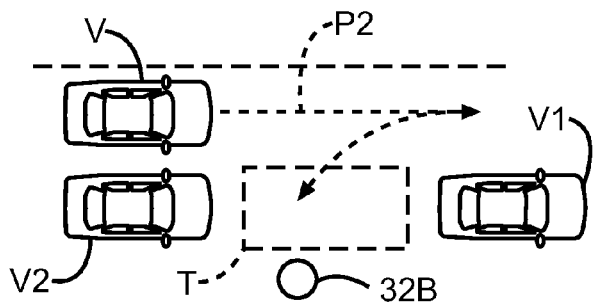
FIG. 3 is a schematic diagram of a third embodiment of a path to a target parking space using the park assist system according to the present invention.

Referring now to FIG. 3 and using like reference numbers to indicated corresponding elements, there is illustrated schematic diagram of a third embodiment of a path P2 to a target parking space T using the park assist system 30 according to the present invention. In this embodiment, the vehicle V is parked between the pair of parked vehicles V1 and V1, and alongside a upright object 32B, such as for example, a garbage can, fire hydrant, tree, column, pole, or the like, in the target parking space T.

Figure 4:
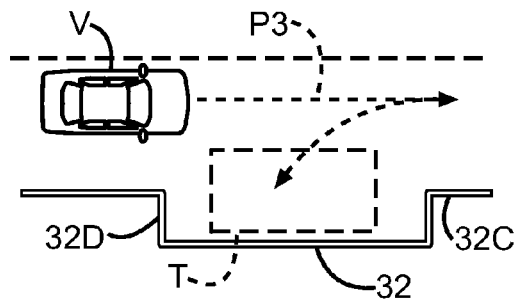
FIG. 4 is a schematic diagram of a fourth embodiment of a path to a target parking space using the park assist system according to the present invention.

Referring now to FIG. 4 and using like reference numbers to indicated corresponding elements, there is illustrated schematic diagram of a fourth embodiment of a path P3 to a target parking space T using the park assist system 30 according to the present invention. In this embodiment, the vehicle V is parked between a parked "forward" object 32C and a "rearward" object 32D which, in the illustrated embodiment, are both part of the object 32 alongside which the vehicle V is to be parked in the target parking space T.

Figure 5:
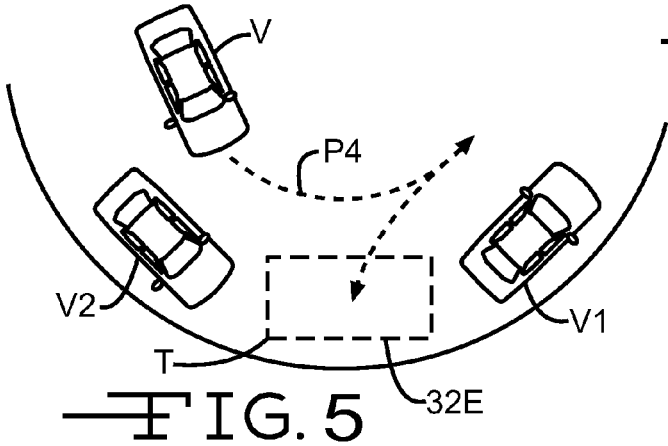
FIG. 5 is a schematic diagram of a fifth embodiment of a path to a target parking space using the park assist system according to the present invention.

Referring now to FIG. 5 and using like reference numbers to indicated corresponding elements, there is illustrated schematic diagram of a fifth embodiment of a path P4 to a target parking space T using the park assist system 30 according to the present invention. In this embodiment, the vehicle V is parked between the pair of parked vehicles V1 and V2, and alongside an object 32E, such as a curved, concave or convex curb, in the target parking space T.

Figure 6:
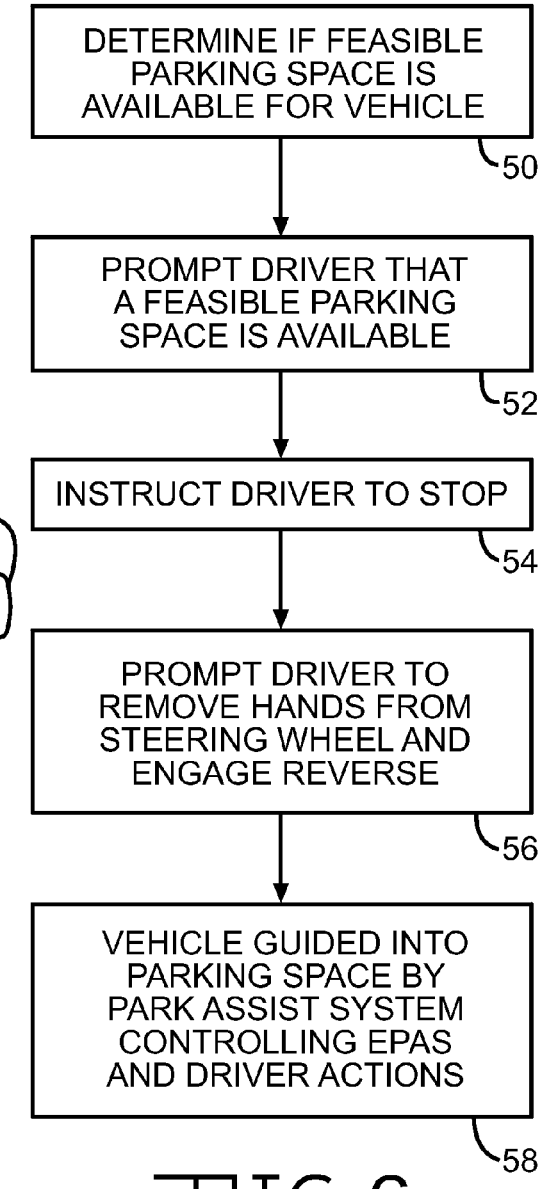
FIG. 6 is a flow chart of an embodiment of a method for parking a vehicle using the park assist system of the present invention.

Referring now to FIG. 6, there is illustrated a flow chart of an embodiment of a method for parking a vehicle using the park assist system 30 of the present invention. As shown in FIG. 6, the method of the present invention includes a first step 50 in which the computer of the park assist system 30 determines if there is a feasible target parking space T available for parking of the vehicle V. To accomplish this, the park assist system 30 uses the sensing system 26. As discussed above, the sensing system 26 not only determines whether there is a sufficient slot length 34 in which to park the vehicle V, but also determines the height H of the object 32 alongside which the vehicle V is to be parked in order to park the vehicle V at a predetermined lateral distance LD from the object 32 dependent upon the particular detected height H of such object relative to a predetermined height of the bottom of the associated vehicle door(s) of the vehicle V.

Once it is determined that a suitable target parking space T has been identified by the park assist system 30 in step 50, the park assist system 30 in step 52 prompts the driver via a visual and/or audible interface that a feasible target parking space T is available and requests acceptance for assistance to park in the space by the driver. Next, in step 54, if the driver accepts the system assistance to park, the driver is instructed by the park assist system 30, either visually and/or audibly, to stop.

After the driver has stopped the park assist system 30 in step 54, the park assist system 30 in step 56 will ask or prompt the driver to remove their hands from a steering wheel of the steering system 18 and engage/shift the transmission of the powertrain system 28 into reverse. Once the driver has removed their hands from the steering wheel and engaged reverse, the park assist system 30 in step 58 will take over the steering wheel movement and control the EPAS system 24 to execute the calculated steering trajectory based on the relative vehicle position to the neighboring objects, i.e., in FIG. 1 the vehicles V1 and V2 and the object 32. The park assist system 30 will prompt the driver when to stop and pull forward and/or backwards as needed until the vehicle V is finally parked in the target parking space T.

One advantage of the embodiments of the present invention is that the park assist system 30 and method of the operation thereof is capable of distinguishing between different heights of objects alongside which the vehicle is to be parked in target parking space. As a result of this, the park assist system 30 can park the vehicle a closer lateral distance to the object alongside the vehicle in instances where the height of the object is such that the vehicle door can be opened and pass over the object compared to the case in which the height of the object is such that the vehicle door cannot be opened and pass over the object. As a result of this, the park assist system 30 and method of operation thereof optimizes the lateral distance in which the vehicle is parked in the target parking spot T.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A park assist system for parking a vehicle in a target parking space comprising:
a park assist system having a sensing system which determines whether there is a sufficient slot length in which to park the vehicle and determines a height of a object alongside which the vehicle is to be parked in the target parking space in order to park the vehicle at a predetermined lateral distance from the object alongside the vehicle dependent upon the particular detected height of such object relative to a predetermined height of a bottom of an associated door of the vehicle.

2. The park assist system of claim 1 wherein the sensing system includes at least one ultrasonic sensor for determining whether there is the sufficient slot length in which to park the vehicle and for determining the height of the object alongside which the vehicle is to be parked in the target parking space.

3. The park assist system of claim 1 wherein the target parking space is a parallel parking space between a forward first object, a rearward second object, and alongside a third object.

4. The park assist system of claim 1 wherein the predetermined lateral distance is a first lateral distance when the object alongside the vehicle when parked in the target parking space is less than the predetermined height of the bottom of the associated vehicle door of the vehicle and is a second lateral distance when the object alongside the vehicle when parked in the target parking space is generally equal to or greater than the predetermined height of the bottom of the associated vehicle door of the vehicle, the first lateral distance being less than the second lateral distance.

5. The park assist system of claim 4 wherein the first lateral distance is when the object alongside the vehicle is a curb.

6. The park assist system of claim 1 wherein the park assist system prompts a driver of the vehicle that a feasible target parking space is available, instructs the driver to stop the vehicle, remove their hands from a steering wheel of the vehicle, and engage reverse whereby the park assist system controls the steering wheel to execute a calculated steering trajectory provided by the park assist system in order to park the vehicle into the target parking space at the predetermined lateral distance from the object alongside the vehicle.

7. A method for parking a vehicle in a target parking spot comprising the steps of:
(a) providing a vehicle having a sensing system and a park assist system operatively connected thereto, the sensing system including at least one ultrasonic sensor which provides an input signal to the park assist system;
(b) scanning neighboring objects using the ultrasonic sensor to determine if a feasible target parking space is available for parking the vehicle, the neighboring objects including at least one object either in front of or behind the vehicle when parked in the target parking space and at least one object alongside the vehicle when parked in the target parking space;
(c) using the park assist system to determine whether there is a sufficient slot length in which to park the vehicle and to determine a height of the object alongside which the vehicle is to be parked in the target parking space in order to park the vehicle at a predetermined lateral distance from the object alongside the vehicle dependent upon the particular detected height of such object relative to a predetermined height of a bottom of an associated door of the vehicle; and
(d) parking the vehicle in the target parking space using the park assist system wherein the vehicle is parked at the predetermined lateral distance from the object alongside the vehicle based upon the detected height of such object relative to the predetermined height of the bottom of the associated vehicle door.

8. The method for parking the vehicle of claim 7 wherein the target parking space is a parallel parking space between a forward first object, a rearward second object, and alongside a third object.

9. The method for parking the vehicle of claim 7 wherein the predetermined lateral distance is a first lateral distance when the object alongside the vehicle when parked in the target parking space is less than the predetermined height of the bottom of the associated vehicle door of the vehicle and is a second lateral distance when the object alongside the vehicle when parked in the target parking space is generally equal to or greater than the predetermined height of the bottom of the associated vehicle door of the vehicle, the first lateral distance being less than the second lateral distance.

10. The method for parking the vehicle of claim 9 wherein the first lateral distance is when the object alongside the vehicle is a curb.

11. The method for parking the vehicle of claim 7 wherein the sensing system further includes at least one odometric sensor and an absolute steering wheel angle sensor which are used in conjunction with the at least one ultrasonic sensor to scan the neighboring objects to determine if a feasible target parking space is available for parking the vehicle.

12. The method for parking the vehicle of claim 7 wherein the vehicle further includes electric power assisted steering system operatively connected to the park assist system.

13. The method for parking the vehicle of claim 7 further including the steps of prompting a driver of the vehicle that a feasible target parking space is available, instructing the driver to stop the vehicle, remove their hands from a steering wheel of the vehicle and engage reverse, and controlling the steering wheel to execute a calculated steering trajectory provided by the park assist system in order to park the vehicle into the target parking space.

14. A method for parking a vehicle in a target parking spot comprising the steps of:
(a) providing a vehicle having a sensing system, a park assist system operatively connected to the sensing system, a steering system including a steering wheel, and a powertrain system;
(b) activating the sensing system to determine if there is a feasible target parking space available for parking of the vehicle, the sensing system determining whether there is a sufficient slot length in which to park the vehicle and determining a height of an object alongside which the vehicle is to be parked in order to park the vehicle at a predetermined lateral distance from the object dependent upon the particular detected height of such object relative to a predetermined height of a bottom of an associated door of the vehicle;
(c) prompting the driver that a feasible target parking space is available;
(d) instructing the driver to stop the vehicle, remove their hands from the steering wheel of the steering system, and engage the powertrain system into reverse; and
(e) controlling the steering wheel to execute a calculated steering trajectory provided by the park assist system in order to park the vehicle into the target parking space.

15. The method for parking the vehicle of claim 14 wherein the target parking space is a parallel parking space between a forward first object, a rearward second object, and alongside a third object.

16. The method for parking the vehicle of claim 14 wherein the predetermined lateral distance is a first lateral distance when the object alongside the vehicle when parked in the target parking space is less than the predetermined height of the bottom of the associated vehicle door of the vehicle and is a second lateral distance when the object alongside the vehicle when parked in the target parking space is generally equal to or greater than the predetermined height of the bottom of the associated vehicle door of the vehicle, the first lateral distance being less than the second lateral distance.

17. The method for parking the vehicle of claim 16 wherein the first lateral distance is when the object alongside the vehicle is a curb.

18. The method for parking the vehicle of claim 14 wherein the sensing system further includes at least one odometric sensor and an absolute steering wheel angle sensor which are used in conjunction with the at least one ultrasonic sensor to scan the neighboring objects to determine if a feasible target parking space is available for parking the vehicle.

19. The method for parking the vehicle of claim 18 wherein the park assist system is a sensor only based system.

20. The method for parking the vehicle of claim 14 wherein the vehicle further includes an electro-hydraulic power assisted steering system operatively connected to the park assist system.

* * * * *